United States Patent [19]

Wells

[11] Patent Number: 4,807,223
[45] Date of Patent: Feb. 21, 1989

[54] COMMUNICATIONS PROTOCOL FOR DISTRIBUTED STATION NETWORK

[75] Inventor: Charles A. Wells, Clearwater, Fla.

[73] Assignee: Critikon, Inc., Tampa, Fla.

[21] Appl. No.: 106,748

[22] Filed: Oct. 8, 1987

[51] Int. Cl.[4] .............................................. H04J 3/02
[52] U.S. Cl. .................................... 370/85; 340/825.5
[58] Field of Search ............... 370/85, 95; 340/825.5, 340/825.51

[56] References Cited

U.S. PATENT DOCUMENTS 4,345,250  8/1982  Jacobsthal ............................ 370/85
4,476,467  10/1984  Terwilliger et al. ............ 340/825.5

Primary Examiner—Douglas W. Olms
Assistant Examiner—Wellington Chin
Attorney, Agent, or Firm—W. Brinton Yorks, Jr.

[57] ABSTRACT

A communication protocol is provided to enable one of a number of transmitters using a common transmission line to independently gain exclusive use of the line. Before transmitting data, a transmitter first monitors the line to establish that it is idle. If it is, the transmitter then asserts the line for an interval unique to that given device. Thereafter the transmitter monitors the device momentarily to determine that no other transmitter is asserting the line and, if so, the transmitter may then gain exclusive control of the line.

13 Claims, 2 Drawing Sheets

COMMUNICATIONS PROTOCOL FOR DISTRIBUTED STATION NETWORK

This invention relates to communication systems in which a number of transmitters share a common transmission channel and, in particular, to a collision-free communications protocol for use by transmitters on a common data bus.

There are numerous situations where it is desirable to have a number of transmitters communicating to one or more receivers over a common transmission channel. To give just one example, in a hospital it is desirable to have a number of remotely located sensors transmit information about numerous individual patients to a central nurse's station. Such an arrangement enables a single nurse to effectively monitor the conditions of a number of patients simultaneously. A nurse can receive and review routine information about a patient's condition, or can be in a position to immediately receive information on a crisis condition, all from the central station. Such a system reduces the need for the nurse to continually travel from patient to patient and possibly be temporarily inaccessible when an emergency arises.

A system such as the above described hospital system could be configured by connecting each remote sensor over its own dedicated communications line to its own dedicated receiver. But for reasons of complexity, flexibility and cost, it is desirable to configure the system by transmitting all sensor information over a common data line to one receiver. The use of the common line, however, creates the need to insure that only one sensor is transmitting information over the line at any one time; otherwise, data transmissions become intertwined and garbled. A common solution to this problem is to employ a central controlling station that polls, or queries, the transmitting stations in some sequential order. This solution presents its own undesirable aspects. First, the polling station is constantly active, regardless of whether a transmitter has data to send. Second, a transmitter with an urgent message cannot begin transmitting even when the line is idle: it must wait its turn to be polled. Third, the arrangement presents a reliability problem. If the polling station fails or is otherwise unable to poll correctly, the entire system is disabled.

The present invention is directed toward a system which prevents message overlap without polling. Instead, a system of the present invention imposes a requirement on each transmitter to insure that the line is idle before transmitting. A situation that must be prevented if message overlap is to be eliminated is the simultaneous commencement of transmission by two transmitters, each of which has just ascertained that the line is idle. This situation is resolved in accordance with the principles of the present invention by the use of a protocol to be followed by any transmitter before transmission of a message. Under the protocol, the transmitter first senses the state of the line for a given period of time to determine that it is idle. The line is idle if the detected state is uniquely different from any valid data transmission. If the line is determined to be idle, the transmitter then asserts a predetermined state on the line. At the end of this transmission, the transmitter senses the state of the line for another period of time. If no other transmission is sensed during this period, the transmitter is then free to transmit its message. The use of this protocol insures that only one transmitter will gain exclusive control over the line at any one time.

Figure 1:
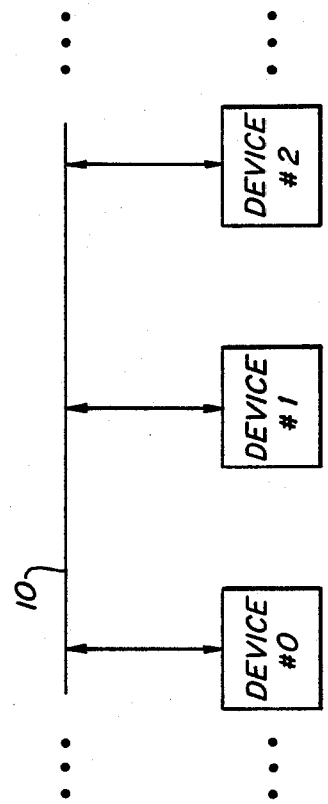
FIG. 1 illustrates in block diagram form a number of communication devices connected to a common bus.

Referring first to FIG. 1, the environment of the present invention is illustrated in block diagram form. In the FIGURE, a number of communications devices, shown as device #0, device #1, and device #2, are connected to a common communications line, bus 10. The devices are operated asynchronously for communication over the bus 10. The two-headed arrow connections between each device and the bus indicate that the devices may be transceivers capable of both transmission over the bus and of listening to, or reading the information which is carried by the bus. Devices connected to the bus may be capable of only reading the information which is on the bus, but those devices which intend to transmit data over the bus must also be capable of sensing or reading the state of the bus.

Figure 2:
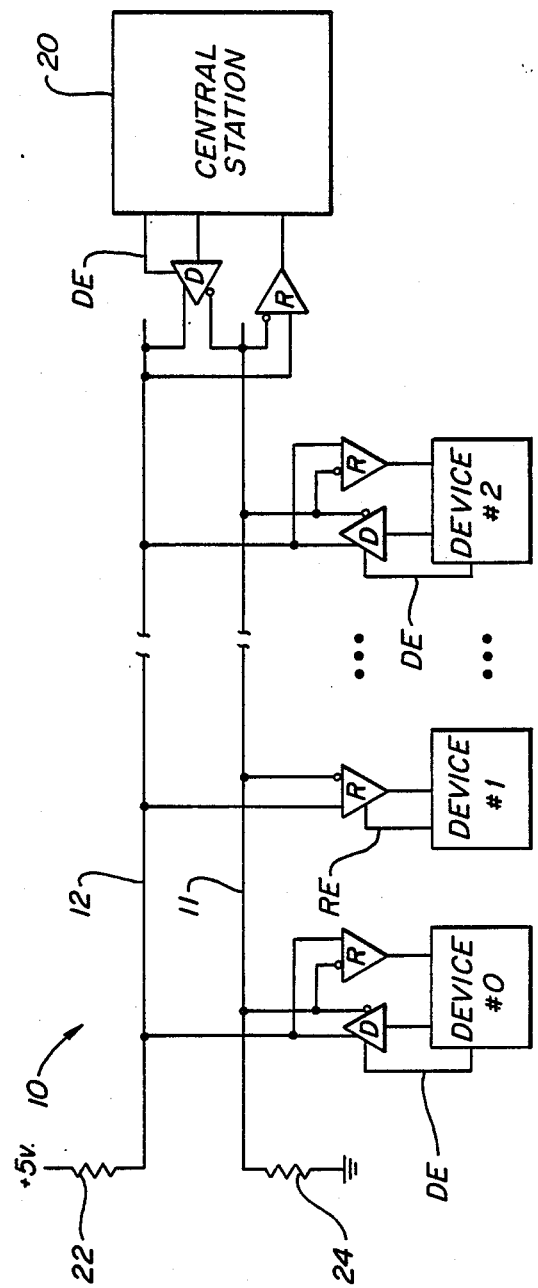
FIG. 2 illustrates in schematic diagram form the interface between a number of communication devices and a common bus.

Referring to FIG. 2, a more detailed preferred embodiment of the present invention is shown. The bus 10 comprises two transmission lines 11 and 12. The bus 10 is operated differentially, and each device is interfaced to the bus by a differential bus transceiver which includes a three-state differential line driver D and a differential-input line receiver R. These differential bus transceivers are commercially available from Texas Instrument Inc. of Dallas, Tex. as Type SN75176 interface circuits. In a differential bus arrangement, it is the relative polarity of the two transmission lines which indicates the information content of the bus. For instance, if line 12 is at a potential of +3 volts and line 11 is at a potential of −3 volts, a differential receiver R would sense a "high" signal on a line, which may be interpreted by the device as a "1" or a "mark" bit. If line 12 were at a potential of zero volts and line 11 were at a potential of +5 volts, the difference of the two would have a negative sense (0 minus 5) and the receiver R would sense a "low" line signal, which would be interpreted by the device as a "0" or "space" bit, depending on the chosen convention. In the preferred embodiment the transmission lines 11 and 12 are switched between zero and five volts, and the bus is sensed as being in either a mark state or a space state.

A receiver R need only be capable of sensing the two binary conditions of the mark state and the space state. If the mark state is a "high" signal as interpreted by the transceiver, then the space state is a "low" signal, or vice-versa. The line drivers D in the preferred embodiment of FIG. 2, however, are capable of presenting three states to the bus 10: a mark state, a space state, and a high impedance state. The latter high impedance state is presented when the device is not transmitting information over the bus. It is imperative in a system in which a station can transmit without prior approval for only one transmitter at a time to be transmitting data. While a transmission is ongoing, the line drivers of the other devices on the bus must be presenting their high impedance state to the bus. In the embodiment of FIG. 2, the line drivers D are controlled by driver enable lines DE. When a DE line is high, the driver is asserting a differential mark or space state on the bus. When the DE line is low, the high impedance state is presented to the bus.

In the embodiment of FIG. 2, devices #0 and #2 are connected as transceivers or transmitters, since the devices are connected to both the driver D and the receiver R of their respective interface circuits. Device #1 does not transmit data, as it is only connected to the receiver of its interface circuit. The device may control the receiver through a receive enable line RE, or the RE line may be held low to continuously receive data with the acceptance or rejection of received data being performed internal to the device.

FIG. 2 shows the bus 10 connected to a central station 20 which is in communication with all of the devices on the bus. Like the devices, the central station 20 communicates over the line by way of its own bus transceiver. The bus is also seen to be terminated by resistors 22 and 24, which establish predetermined states on the lines when the bus is idle.

Figure 3:
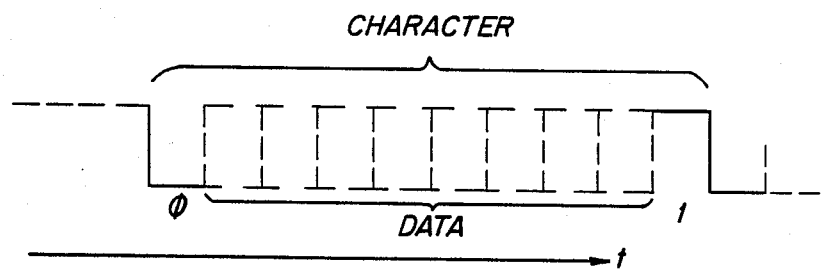
FIG. 3 illustrates the character data pattern preferred embodiment of the present invention.

FIG. 3 illustrates the serial data format of the characters which are transmitted over the bus in FIG. 2. A data character is ten bits in length, beginning with a space bit 0 and ending with a mark bit 1. Between the mark an space bits are eight bits of data which are variably either mark or space bits.

Figure 4:
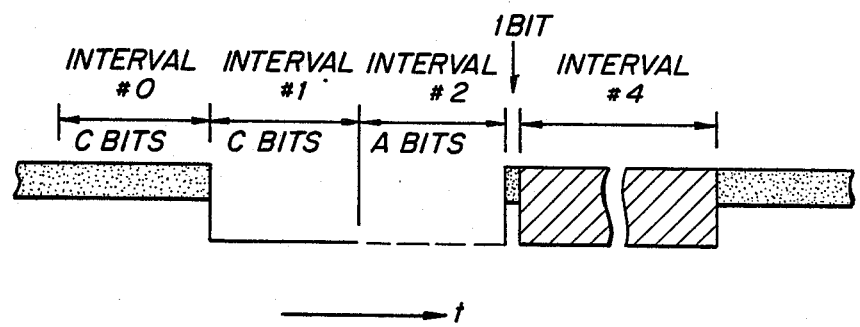
FIG. 4 illustrates the communication protocol of the preferred embodiment of the present invention.

In accordance with the principles of the present invention a collision-free communication protocol is provided to allow the multiple devices to transmit over the bus without interference with each other. Collision-free communication is desirable because it reduces overhead on the network and it reduces the burden of error control. The protocol allows any device wishing to transmit a message a means of gaining exclusive control over the data bus. The protocol of the preferred embodiment is shown in FIG. 4.

To send a message over the bus a device invokes the following procedure. First, the device listens to the bus through its receiver R for a line condition that indicates the absence of character transmission on the bus. This is shown in FIG. 4 as interval #0, which has a duration of C bits. The determination of the absence of character transmission on the bus is dependent upon the character format. In the example of FIG. 3, a character is seen to contain a space bit and a mark bit within the character bit length of ten bits. Therefore, if interval #0 is ten bits in length and the device desiring to transmit senses no space bit during this time, the device would conclude that there is no character transmission ongoing; the bus is idle. During interval #0 the device would see the condition established when the high impedance state is presented to the bus by all other devices, as indicated by the shaded bar in FIG. 4. If the device would sense a space bit on the bus during interval #0, it would restart the interval.

In the preferred embodiment of FIG. 2, the terminating resistors 22 and 24 establish the condition of the mark state on the bus during those times that all drivers are presenting their high impedance state to the bus. Under these conditions, and with the character format of FIG. 3, an idle bus would be determined by C consecutive bits of the mark state where C is equal to ten. In essence, the device is listening for the absence of the initial space bit of a character.

The receivers R of the preferred embodiment need only be capable of sensing the mark and space states of the bus. It is not necessary for the receiver to sense the existence of the high impedance state presented by all other stations on the line. This lesser requirement allows the use of relatively simple, commercially available transceivers in the preferred embodiment, as discussed above. If a receiver capable of distinguishing between all three bus states were used, a termination establishing a high impedance condition would be employed, and either the mark or space bit of a character transmission would be sensed to indicate that the bus is not idle.

If the device desiring to transmit finds that the bus is idle at the end of interval #0, the device then switches its driver from the high impedance condition to the space condition for the next two intervals. This is shown in FIG. 4 as interval #1 and interval #2, where C bits is the character length and "a" bits is a unique device identifier bit sequence. The space state overrides the high impedance condition of the bus, and also the mark state established by the terminating resistors, if present. The C bits of the space condition of interval #1, with a bit length of ten in this example, presents what is unambiguously an invalid character when the character format of FIG. 3 is used. Thus, any receiver listening on the bus for character information would identify the interval #1 transmission as an invalid character by reason of the absence of the tenth mark bit.

In the preferred embodiment, interval #1 is followed by a further interval #2 of "a" bits of the space condition. This is an address transmission which identifies the source of the message and also establishes priority among devices competing for bus access. The address "a" uniquely identifies a device and has a bit length varying between 0 and minimally N−1, where N is the number of transmitting devices on the bus. In the three-device example of FIG. 2, a bit length "a" equal to zero, one, or two would uniquely identify each of the three devices.

After interval #2, the driver is switched from the space condition to the high impedance condition, and the state of the bus is sensed. If the bus is sensed as being in the mark state (i.e., all other transmitters are in the high impedance state), then the device has exclusive control of the bus and can begin a continuous transmission of data characters. At the end of the data transmission the driver switches back to the high impedance condition.

However, if a space condition is sensed after interval #2, the bus is not idle and the device must restart the protocol. This would occur, for instance, when two devices tried to access the bus simultaneously and began the protocol at the same time. Neither device would be aware of the intentions of the other until the device with the shorter address "a" ended its interval #2 and sensed the state of the bus. At that time it would sense the space bit asserted on the bus by the device with the longer address "a", and the device with the shorter address would restart the protocol. In this way, a number of contending devices would sequentially restart the protocol until only the device with the longest address remained in contention and acquired exclusive access to the bus. Thus, in a simultaneous contention situation, the device with the longest address would prevail, and hence would have the highest priority. The assignment of addresses thereby prioritizes the system.

It is seen in FIG. 4 that the sensing period after interval #2 is one bit in length. If the sensing period were C bits or longer, it may be appreciated that another device on the bus would identify the period as an idle bus condition during its own interval #0. Accordingly, the sense period must have a duration of less than C bits. A one bit duration is optimal for establishing the shortest protocol length. However, if propagation delay along the bus is a significant consideration, then the sensing period must be set to be greater than the network's propagation delay, which is functionally related to the baud rate of a serial communications system.

A further advantage of the protocol of the present invention is that receiving devices need no special logic to decode or discriminate the protocol. Many traditional asynchronous receivers will reject C or greater bit lengths of space bits as invalid characters. In the protocol of FIG. 4, the time during which the protocol is actively asserting the bus, intervals #1 and #2, comprises just such a sequence of space bits. Thus, the asynchronous receivers on the bus will detect the protocol as simply an invalid transmission and will reject it. The reception of valid data does not occur until the first character transmitted at the beginning of interval #4, when a device has acquired exclusive control of the bus.

During times of consecutive messages occurring when demand for the bus is high, the interval #0 may be seen to serve two purposes. On the one hand it is the first procedure in the protocol. On the other, it serves as a message framing interval. When a message of consecutive characters ends, a receiving device generally will know the message has ended by sensing the ten bits of the mark state which follow the message, when no device is asserting the bus. Thus, the ten bits of mark at the end of a message serve to inform the receiving device that the message has ended; and the mark bits also serve as interval #0 for a device which has been waiting to transmit over the bus.

The communication system of the present invention has been successfully employed in a network of automated blood pressure monitors connected to a central receiving station. The monitors automatically take blood pressure readings and send medical information at intervals ranging from once every several hours to several times a second. Using the protocol of the preferred embodiment, the monitors asynchronously send data over a common line without interference. Asynchronous operation would also occur if the monitors were not operated automatically, but were activated periodically by a nurse making rounds from patient to patient. The protocol of the present invention solves a very real problem in the hospital environment where, after a lengthy transmission by one device, several waiting devices will simultaneously attempt to assume control over the bus. The protocol avoids collisions without any intervention from the central station.

Although the preferred embodiment utilizes a differential bus, the present invention is equally applicable to single-ended line systems. In such a system provision would be made for one of a plurality of transmitter connected to the line to have exclusive control of the line, such as through the use of tri-state logic or open-collector line drivers.

What is claimed is:

1. In a communications network employing a plurality of transmitting devices capable of sending messages over a common message line, said messages being comprised of one or more message units of predetermined durations, a protocol for enabling a transmitting device to gain exclusive access to the line independent of a central line access controller, said protocol comprising the steps of:
(a) monitoring the message line for at least the duration of a message unit to determine that the line is idle; and if so (b) asserting the line for a predetermined period with a binary signal that differs from a valid message and is unique to the transmitting device seeking line access; and then
(c) monitoring the message line for a second predetermined period which is less than said monitoring duration of step (a) to determine the absence of binary signals thereon; and if so,
(d) recognizing that the transmitting device may now gain exclusive access to the line.

2. The arrangement of claim 1, wherein step (a) comprises monitoring the line for the duration of a message unit to determine the absence of binary information signals on the line which correspond to a message unit.

3. The arrangement of claim 2, wherein said predetermined period of step (b) includes a first interval at least equal to the duration of a message unit, and a second interval uniquely identifying the transmitting device.

4. The arrangement of claim 3, wherein said second predetermined period is less than the duration of a message unit.

5. The arrangement of claim 4, wherein step (d) comprises transmitting a message over the line.

6. In a communications system employing plural independent stations mutually interconnected on a common bus, each of said stations including transmission and reception means and having a distinct address code, a protocol for contention free, distributed control comprising the steps of:
(a) each unit maintaining a condition wherein it does not assert the bus unless it is required to engage in transmission; and
(b) when transmission by a given unit is required,
  (i) refraining from transmission until said bus is quiescent for at least a first predetermined time; and
  (ii) then transmitting data for a time related to the address code of said given unit;
  (iii) then monitoring said bus, during a second predetermined time which is less than said first predetermined time, for presence of data from other stations; and
  (iv) if no data is detected during said second predetermined time, proceeding to transmit as required and without interruption until transmission is completed.

7. The arrangement of claim 6, wherein said first predetermined time is related to the format of data transmitted on said common bus.

8. In a communication network in which a plurality of transmitting devices are coupled to a common message line, a protocol whereby a given device may establish exclusive use of the line for transmission without intervention by a central line controller, said protocol comprising the steps of:
(a) monitoring the line for an interval C to establish that the line is quiescent; then
(b) asserting the line for an interval C+A, where A is unique to said given device; then
(c) monitoring the line for an interval which is less than C to establish that no other device is asserting the line and, if so,
(d) establishing that the given device may use the line exclusive of other transmitting devices on the line.

9. The arrangement of claim 8, wherein C is related to the duration of a message unit.

10. The arrangement of claim 9, wherein A is zero or greater.

11. The arrangement of claim 10, wherein A is a number ranging from zero to minimally N−1, where N is the number of transmitting devices coupled to the line.

12. The arrangement of claim 10, wherein step (d) comprises transmitting a message continuously over the line.

13. The arrangement of claim 12, wherein step (b) comprises establishing a condition on the line which will not be recognized by other devices as a quiescent condition for the interval C+A.

* * * * *